Figure 1:
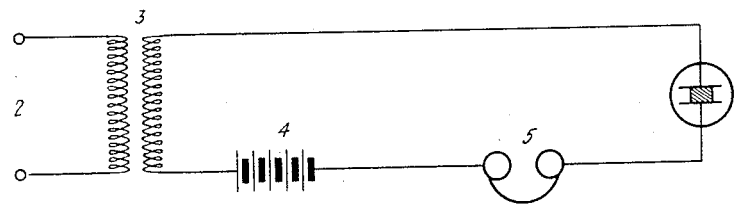

Jan. 2, 1934.  W. RUNGE  1,941,581
MEANS TO INDICATE RESONANCE IN A CRYSTAL RESONATOR
Filed April 25, 1931

INVENTOR
WILHELM RUNGE
BY
ATTORNEY

Patented Jan. 2, 1934

1,941,581

UNITED STATES PATENT OFFICE 1,941,581

MEANS TO INDICATE RESONANCE IN A CRYSTAL RESONATOR

Wilhelm Runge, Berlin, Germany, assignor to Telefunken Gesellschaft fur Drahtlose Telegraphie m. b. H., Berlin, Germany, a corporation of Germany Application April 25, 1931, Serial No. 532,972, and in Germany April 30, 1930

1 Claim. (Cl. 250—39)

It is known in the prior art that separately excited oscillations of a quartz resonator at its own natural period may be rendered perceptible by enclosing the quartz crystal conjointly with its electrodes within a vessel which is filled with low pressure rare gas such as neon. The high voltages arising upon the surface of the crystal owing to piezo-electric actions, in the presence of resonance, cause a glow discharge, and this discharge becomes visible in the form of a glow of the crystal. The flashing up of the quartz crystal serves as an indication of resonance between the outside exciting frequency and the natural period of the crystal.

In the devices known in the prior art the luminescence or flashing is perceivable with the naked eye. Still, it is always recommendable to screen off whatever bright outside light there may be when observing the crystal. When making observations in the open when the eye is accommodated to great brightness, the attempt to observe the luminescence is attended with difficulties.

If the quartz resonator is used for the purpose of checking up on the frequency of a transmitter, it is inconvenient to constantly keep the luminous action under observation. Indeed, it would then be desirable to obtain, instead of the luminous action, or in addition to it, some other effect from the quartz resonator whereby signals may be actuated in some simple way.

In addition to the wave to be checked up, according to this invention, a suitably chosen direct current potential is applied to the luminescent quartz crystal. In series with the direct current potential source, a device responsive to alternating current or direct current is provided, say, a telephone receiver, the input terminals of an audio frequency amplifier, a relay, a galvanometer or the like. If the auxiliary direct current potential is properly chosen, a direct current and an alternating current will arise in the circuit comprising the quartz resonator, the direct current source, and the current indicator while the luminescence is going on, the frequency of said alternating current having no relation to the resonance frequency or the input frequency which is to be controlled or checked up. The same apparently is ascribable to the fact that the existence of the direct current potential, as soon as a glow-discharge is produced, tends to damp the vibrations of the crystal with the result that the amplitude thereof is diminished. Since the direct current potential alone is unable to maintain a glow-discharge, the luminous action will then be caused to go out. As a result the additional damping disappears, and the crystal is again allowed to vibrate more energetically until a glow-discharge is produced. During the glow-discharge a discharge current flows from the direct current potential source by way of the alternating current indicator device through the glow-discharge gap.

Now, this pulsating current is clearly audible and is thus perceived in the receiver, even if it persists only for a short while, for instance, when the frequency or wave to be checked up is rapidly altered and rapidly passed through the resonance frequency of the crystal. Hence, the locating of the resonance point is greatly facilitated by this device. If the point is merely to make the resonance of the luminescent quartz clearly visible also in bright light, then, instead of the alternating current instrument also a direct current instrument could be included in the battery circuit. This direct current instrument during the luminous action indicates the discharge current of the direct current source flowing through the glow-discharge gap, and the same disappears as soon as the amplitude of the quartz is small, provided the potential of the direct current source has been so chosen that it will by itself not be adequate for maintaining the glow-discharge.

Figure 2:
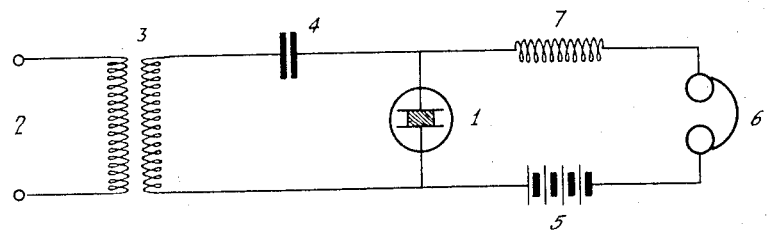
Figure 3:
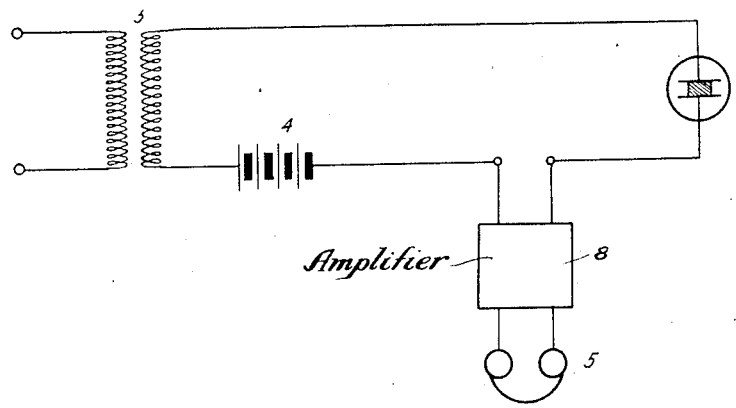

A better understanding of the invention will be had by reference to the drawing in which:

Figure 1 shows a simplified resonance indicator arranged in accordance with the present invention; while, Figures 2 and 3 show modifications of the arrangement of Figure 1.

The circuit diagram shows a fundamental embodiment of the invention. The wave to be controlled is fed to the luminescent quartz 1 of known construction by way of the input terminals 2 of transformer 3. In series with the secondary winding of transformer 3 is a direct current potential source 4 and the telephone receiver 5. The direct current potential must be so chosen that by itself it will not be sufficient for maintaining the glow discharge of the luminescent quartz crystal. If the crystal is caused to undergo marked resonant vibrations by action of the oscillations fed to it, then a rattling or a singing sound will be heard in the telephone receiver, and this clearly indicates the marked oscillating of the crystal. Instead of receiver 5, also some other means adapted to indicate direct current or alternating current may be used.

Arrangements could be made also in a way as shown in Figure 2. In this case the luminous crystal 1 receives the wave to be checked up by it by way of the input terminals 2 of transformer 3. The secondary of transformer 3 is blocked against direct current by means of the condenser 4. Battery 5 together with the receiver 6 and the crystal 1 constitutes another circuit which is safeguarded from alternating current of the order of magnitude of the resonance frequency of the crystal by means of choke-coil 7. The operation is exactly the same as in the case of Figure 1.

In case stronger current indications are desired the arrangement of Figure 3 can be used. Here the current indications are amplified at 8 and then applied to indicator 5.

The amplifier 8 of Figure 3 may also be applied to the arrangement of Figure 2 if desired.

Having thus described my invention and the operation thereof, what I claim is:

An indicating system comprising an input coil, a two electrode piezo-electric crystal, a blocking condenser, a connection from one electrode of said crystal to one end of said coil, and connections serially connecting the other electrode of said crystal to the other end of said coil and said condenser, and, an audio frequency circuit connected in shunt to the electrodes of said piezo-electric crystal, said circuit consisting of the series combination of a source of potential, a pair of ear phones, and a choke coil.

WILHELM RUNGE.

CERTIFICATE OF CORRECTION.

Patent No. 1,941,581.  January 2, 1934.

WILHELM RUNGE.

It is hereby certified that error appears in the printed specification of the above numbered patent requiring correction as follows: Page 1, line 59, before "glow-discharge" insert the word new; and that the said Letters Patent should be read with this correction therein that the same may conform to the record of the case in the Patent Office.

Signed and sealed this 21st of July, A. D. 1936.

(Seal)

Henry Van Arsdale
Acting Commissioner of Patents.